(12) United States Patent
Chan et al.

(10) Patent No.: US 10,372,994 B2
(45) Date of Patent: Aug. 6, 2019

(54) METHOD, SYSTEM AND APPARATUS FOR SELECTING A VIDEO FRAME

(71) Applicant: CANON KABUSHIKI KAISHA, Tokyo (JP)

(72) Inventors: Sammy Chan, Beecroft (AU); Ka Ming Leung, Marsfield (AU); Mark Ronald Tainsh, Pymble (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/585,020

(22) Filed: May 2, 2017

(65) Prior Publication Data

US 2017/0330038 A1 Nov. 16, 2017

(30) Foreign Application Priority Data

May 13, 2016 (AU) ................................ 2016203135

(51) Int. Cl.
*G06K 9/00* (2006.01)
(52) U.S. Cl.
CPC ..... *G06K 9/00744* (2013.01); *G06K 9/00268* (2013.01); *G06K 9/00597* (2013.01); *G06K 9/00751* (2013.01)
(58) Field of Classification Search
CPC .................................................. G06K 9/00268
See application file for complete search history.

(56) References Cited

U.S. PATENT DOCUMENTS

| 6,393,136 B1 | 5/2002 | Amir et al. |
| 7,262,788 B2 | 8/2007 | Ono et al. |
| 7,266,225 B2 | 9/2007 | Mariani et al. |
| 7,916,894 B1 | 3/2011 | Dhillon et al. |
| 8,379,154 B2 | 2/2013 | Zhang |

(Continued)

FOREIGN PATENT DOCUMENTS

| JP | 2010-258487 A | 11/2010 |
| JP | 2011-082915 A | 4/2011 |
| JP | 2013-038662 A | 2/2013 |

OTHER PUBLICATIONS

Fiss, et al., "Candid portrait selection from video", In ACM Transactions on Graphics (TOG), vol. 30, No. 6, p. 128. ACM, 2011.

(Continued)

*Primary Examiner* — Oneal R Mistry
(74) *Attorney, Agent, or Firm* — Canon U.S.A., Inc. I.P. Division

(57) ABSTRACT

A method of selecting at least one video frame of a video sequence. A plurality of faces is detected in at least one video frame of the video sequence. An orientation of the detected faces is tracked over a series of subsequent video frames to determine whether a first detected face is turning towards a second detected face. The method then determines, using the tracked orientation of the detected faces, a portion of the video sequence in which the first and second detected faces are oriented towards each other for at least a predetermined number of frames defining a gaze fixation of the detected faces. At least one video frame is selected from the determined portion of the video sequence, the selected video frame capturing the gaze fixation of the detected faces.

12 Claims, 10 Drawing Sheets

(56) References Cited

U.S. PATENT DOCUMENTS

| | | | |
|---|---|---|---|
| 8,401,248 B1 * | 3/2013 | Moon | G06Q 30/0242 |
| | | | 382/103 |
| 8,520,052 B2 | 8/2013 | Venolia et al. | |
| 8,761,459 B2 | 6/2014 | Kaneda et al. | |
| 8,817,126 B2 | 8/2014 | Cheatle et al. | |
| 8,854,282 B1 | 10/2014 | Wong | |
| 2007/0189627 A1 * | 8/2007 | Cohen | G06K 9/00228 |
| | | | 382/254 |
| 2009/0019472 A1 * | 1/2009 | Cleland | G06Q 30/02 |
| | | | 725/34 |
| 2014/0372957 A1 | 12/2014 | Keane et al. | |
| 2016/0019426 A1 * | 1/2016 | Tusch | G11B 27/034 |
| | | | 386/286 |

OTHER PUBLICATIONS

Fono, et al., "EyeWindows: using eye-controlled zooming windows for focus selection", In Proceedings of the SIGCHI conference on Human factors in computing systems, pp. 151-160. ACM, 2005.

* cited by examiner

METHOD, SYSTEM AND APPARATUS FOR SELECTING A VIDEO FRAME

REFERENCE TO RELATED PATENT APPLICATION(S)

This application claims the benefit under 35 U.S.C. § 119 of the filing date of Australian Patent Application No. 2016203135, filed May 13, 2016, hereby incorporated by reference in its entirety as if fully set forth herein.

TECHNICAL FIELD

The present disclosure relates generally to image processing and, in particular, to a method, system and apparatus for selecting a video frame of a video sequence. The present invention also relates to a computer program product including a computer readable medium having recorded thereon a computer program for selecting a video frame of a video sequence.

BACKGROUND

Video is an effective way to capture a scene or an unfolding event. People often capture videos for birthday parties, weddings, travel and sports events. Unlike still images, video has an advantage of capturing evolving, unstructured events, such as particular natural facial expressions and human interactions (e.g. talking, mutual smiling, kissing, hugging, handshakes). It is often desirable to select individual frames from a sequence of video frames for display or for use as content in printed books in the same way as still images are used. In addition, sub-sections of the video sequence, known as segments, can be selected to be displayed as a summary representation of the video sequence. A video segment comprises a series of sequential video frames of a video sequence.

With increasing demand and accessibility of mobile phones and other consumer oriented camera devices, more and more video data is being captured and stored. Hence, it is increasingly more difficult to find the relevant videos and/or to extract desirable frames of the videos for printing or display.

One method of selecting video frames determines desirable video segments or frames solely based on image quality measures including photographic composition, colour distribution, blur, colour contrast, sharpness and exposure. Instead of performing image analysis directly on portable devices, an alternative method of selecting video frames or segments uses camera specific parameters such as aperture, shutter speed, ISO, types of lens and camera motion. More recent methods of selecting video frames attempt to extract high-level semantics from videos to facilitate video segment and image selection by identifying faces, objects, types of events, and human activities. In particular, for wedding and sporting videos, some methods detect camera flashes and audio features (e.g. music, applause and cheers) to identify important scenes, objects, and events in a video sequence.

SUMMARY

It is an object of the present invention to substantially overcome, or at least ameliorate, one or more disadvantages of existing arrangements.

According to one aspect of the present disclosure, there is provided a method of selecting at least one video frame of a video sequence, the method comprising:

detecting a plurality of faces in at least one video frame of the video sequence;

tracking an orientation of the detected faces over a series of subsequent video frames to determine whether a first detected face is turning towards a second detected face;

determining, using the tracked orientation of the detected faces, a portion of the video sequence in which the first and second detected faces are oriented towards each other for at least a predetermined number of frames defining a gaze fixation of the detected faces; and selecting at least one video frame from the determined portion of the video sequence, said selected video frame capturing the gaze fixation of the detected faces.

According to another aspect of the present disclosure, there is provided a system for selecting at least one video frame of a video sequence, the system comprising:

a memory for storing data and a computer program;

a processor coupled to the memory for executing the computer program, the computer program comprising instructions for:

detecting a plurality of faces in at least one video frame of the video sequence;

tracking an orientation of the detected faces over a series of subsequent video frames to determine whether a first detected face is turning towards a second detected face;

determining, using the tracked orientation of the detected faces, a portion of the video sequence in which the first and second detected faces are oriented towards each other for at least a predetermined number of frames defining a gaze fixation of the detected faces; and selecting at least one video frame from the determined portion of the video sequence, said selected video frame capturing the gaze fixation of the detected faces.

According to still another aspect of the present disclosure, there is provided an apparatus for selecting at least one video frame of a video sequence, the apparatus comprising:

means for detecting a plurality of faces in at least one video frame of the video sequence;

means for tracking an orientation of the detected faces over a series of subsequent video frames to determine whether a first detected face is turning towards a second detected face;

means for determining, using the tracked orientation of the detected faces, a portion of the video sequence in which the first and second detected faces are oriented towards each other for at least a predetermined number of frames defining a gaze fixation of the detected faces; and means for selecting at least one video frame from the determined portion of the video sequence, said selected video frame capturing the gaze fixation of the detected faces.

According to still another aspect of the present disclosure, there is provided a computer readable medium having a computer program stored on the medium for selecting at least one video frame of a video sequence, the program comprising:

code for detecting a plurality of faces in at least one video frame of the video sequence;

code for tracking an orientation of the detected faces over a series of subsequent video frames to determine whether a first detected face is turning towards a second detected face;

code for determining, using the tracked orientation of the detected faces, a portion of the video sequence in which the first and second detected faces are oriented towards each other for at least a predetermined number of frames defining a gaze fixation of the detected faces; and code for selecting at least one video frame from the determined portion of the video sequence, said selected video frame capturing the gaze fixation of the detected faces.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
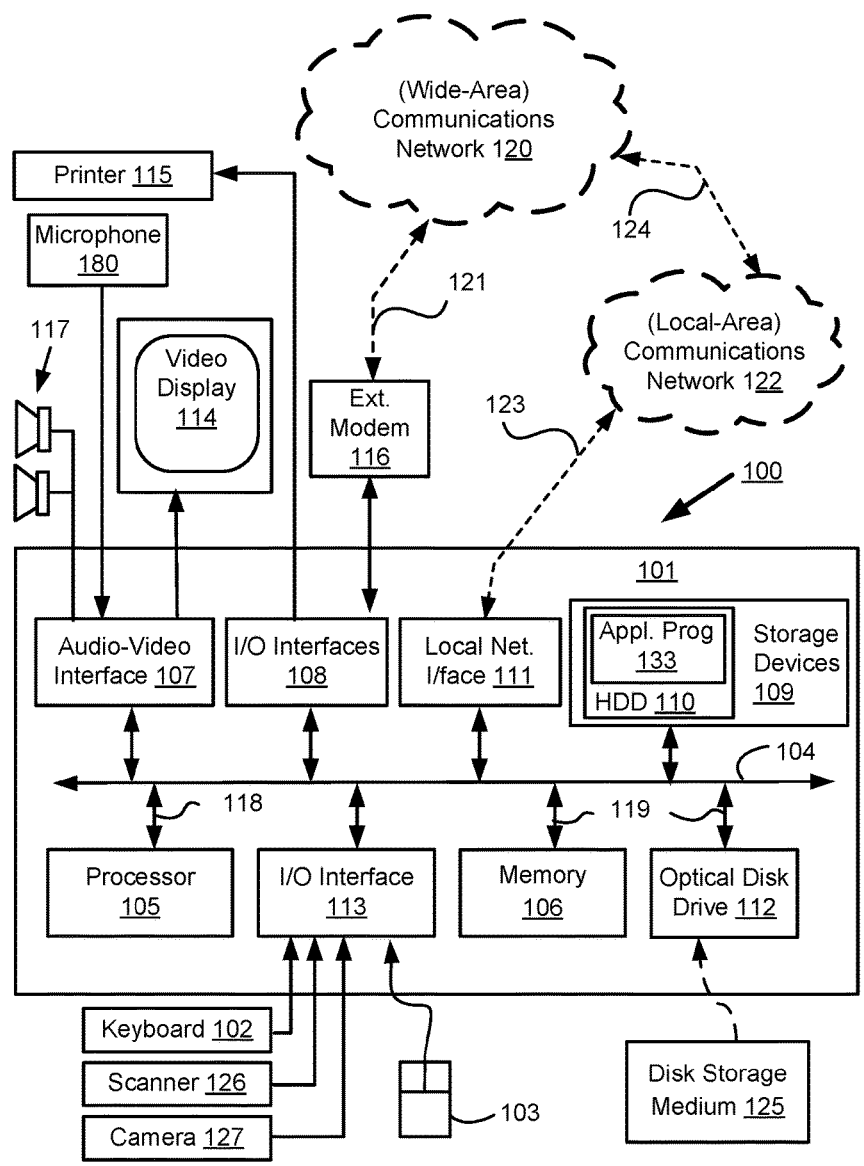
FIGS. 1 and 2 form a schematic block diagram of a general purpose computer on which described arrangements may be practised.

Where reference is made in any one or more of the accompanying drawings to steps and/or features, which have the same reference numerals, those steps and/or features have for the purposes of this description the same function(s) or operation(s), unless the contrary intention appears.

Frames where there are interactions between people may be selected from a sequence of video frames for printing, display or the like. For example, frames where there are a number of people present may be selected. As another example, frames where people are actively engaged with each other may be selected. Such active engagement can involve talking, smiling and may require at least two people looking at each other. However, detecting such engagement using conventional methods can be computationally expensive.

The present disclosure is directed towards providing a method of selecting desirable video frames from a sequence of video frames based on detection of engagement between subjects shown in the video frames. As described in detail below, relevant video segments and frames can be extracted from a sequence of video frames. Each video segment comprises a series of sequential video frames of a video sequence. The video frames can be extracted from a video sequence in a video decoding process. The extracted frames can be treated the same as images obtained through digital still photography. The terms "image" and "frame" are used interchangeably in the following description.

Figure 2:
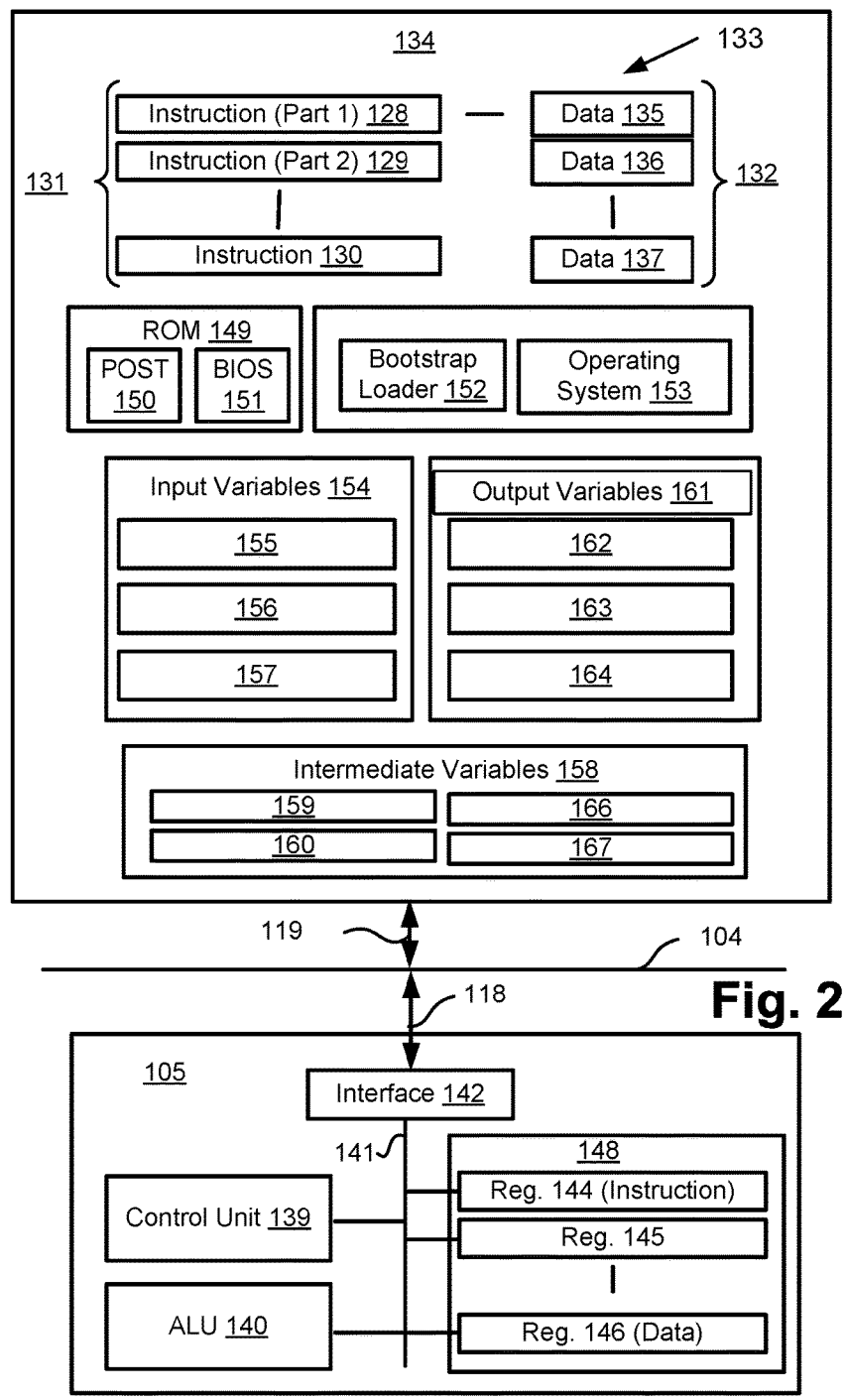

FIGS. 1 and 2 depict a general-purpose computer system 100, upon which the various arrangements described can be practiced.

As seen in FIG. 1, the computer system 100 includes: a computer module 101; input devices such as a keyboard 102, a mouse pointer device 103, a scanner 126, a camera 127, and a microphone 180; and output devices including a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™, USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

Methods described below may be implemented using the computer system 100 wherein the processes of FIGS. 3 to 8, to be described, may be implemented as one or more software application programs 133 executable within the computer system 100. In particular, the steps of the described methods are effected by instructions 131 (see FIG. 2) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 2 is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1.

When the computer module 101 is initially powered up, a power-on self-test (POST) program 150 executes. The POST program 150 is typically stored in a ROM 149 of the semiconductor memory 106 of FIG. 1. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1 must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 2, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 2, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 3 to 8 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods may alternatively be implemented in dedicated hardware such as one or more integrated circuits performing the functions or sub functions of described methods. Such dedicated hardware may include graphic processors, digital signal processors, or one or more microprocessors and associated memories.

Figure 3:
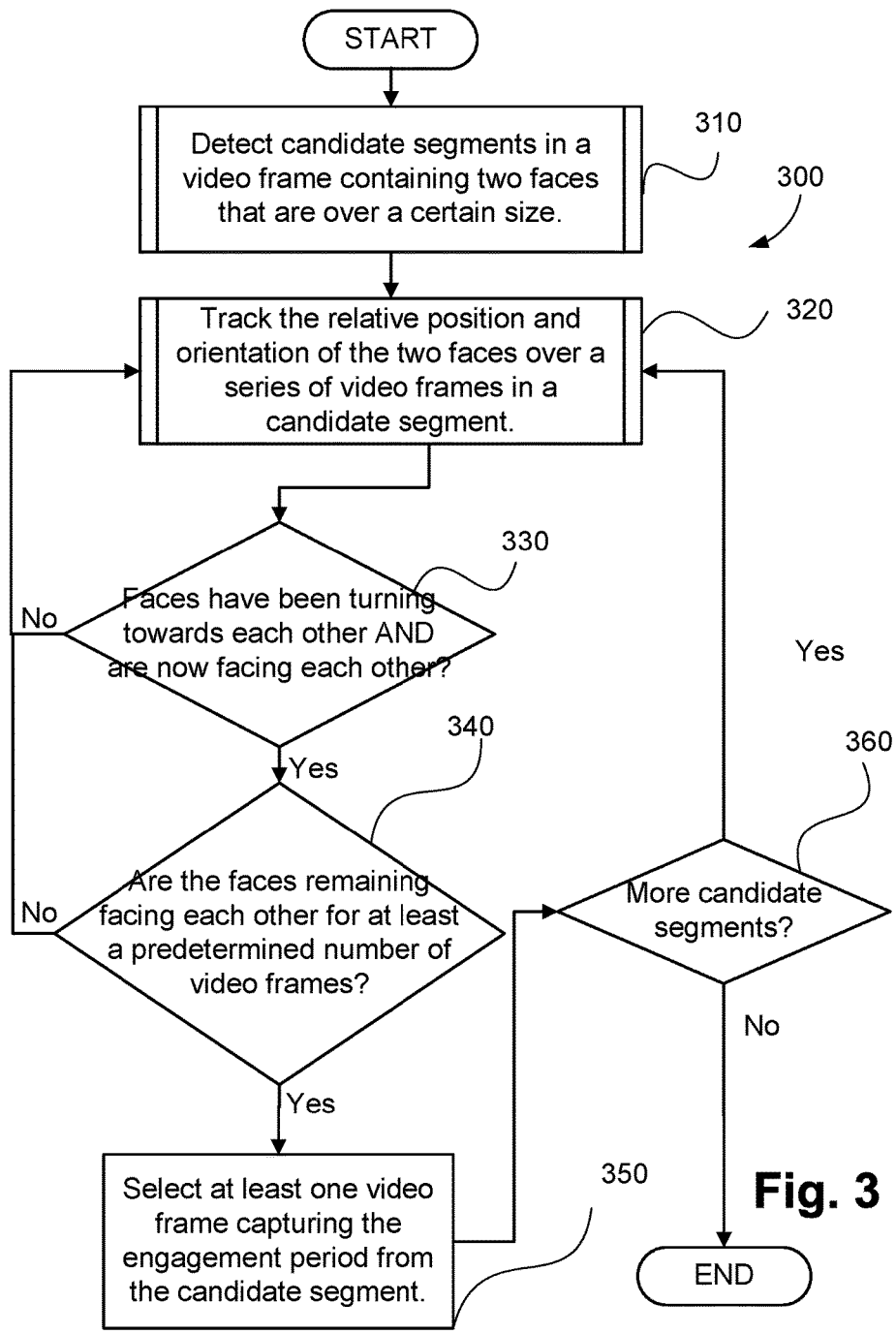
FIG. 3 is a schematic flow diagram showing a method of selecting at least one video frame of a video sequence.

FIG. 3 is a flow diagram showing a method 300 of selecting at least one video frame of an input video sequence. The method 300 determines desirable frames from the video sequence based on detection of engagement between subjects shown in the video frames of the video sequence.

Many factors may be used to determine appealing frames from both a video sequence and still photography. Traditional image quality factors such as sharpness and acceptable saturation may be used to select images. Additionally more abstract factors including actions, smiles, and cliché content (e.g., a child blowing out a candle at a birthday party), if detected can be used to select images.

One class of content that is appealing in images is people who are actively engaged with each other. The active engagement can involve, for example, people being captured within an image talking to and smiling at each other.

The method 300 provides a computationally inexpensive technique compared to existing arrangements. The method 300 determines where two or more people in a video sequence have established engagement and selects frames or segments of the video sequence based on an engagement period. As described above, each video segment comprises a series of sequential video frames of the video sequence.

The term "gaze fixation" refers to an item detected, in accordance with the method 300, based on a period of engagement, as will be described in detail below. As described, gaze fixation may be dependent on a predetermined gaze fixation threshold period.

The term "gaze fixation" should not be taken to be "gaze detection" which refers to tracking of the direction of an eye. However, gaze detection together with depth detection may be used as an alternate step in monitoring face orientation as described below. The method 300 provides an advantage over the mere use of gaze detection and depth detection in selecting frames of a video sequence, due to the lack of accuracy and complexity of gaze detection and depth detection.

The method 300 may be used to generate and display a video summary using the computer system 100 of FIG. 1, by merging one or more desirable but disjointed video segments extracted from an input video sequence.

The method 300 may also be used to select one or more desirable frames from extracted video segments of the video sequence for printing (e.g. for the purpose of creating a photobook). The one or more video frames are displayed or printed from the input sequence of video frames.

The method 300 will be described by way of example with reference to FIG. 3. The method 300 may be implemented as one or more software code modules of the software application program 133 resident in the hard disk drive 110 being controlled in its execution by the processor 105.

The input to the method 300 is a video sequence comprising a plurality of video frames showing an evolving event or scene. The input video sequence may include one or more multiple audio channels synchronised with video signals. The input video sequence may include a single "shot" (i.e., a take) where a shot is a continuous sequence of video frames (e.g., captured without changing cameras or without pausing/stopping capture of the frames of the video sequence). In other cases, the video sequence includes multiple shots.

In some cases, the input video sequence may be a home video. Alternatively, the video sequence may be a video professionally created by following the rules of cinematography.

The method 300 begins at a candidate video segment detecting step 310, where a set of candidate video segments showing a scene containing a plurality of (i.e., two or more) faces are detected under execution of the processor 105. Each of the candidate video segments represents a portion of the input video sequence. Each portion of the input video sequence comprises a series of sequential video frames of the video sequence.

In one arrangement, the faces detected at step 310 may be required to be larger than a predetermined size threshold. A method 400 of detecting a candidate video segment, as executed at step 310, will be described in detail later with reference to FIG. 4.

Figure 5:
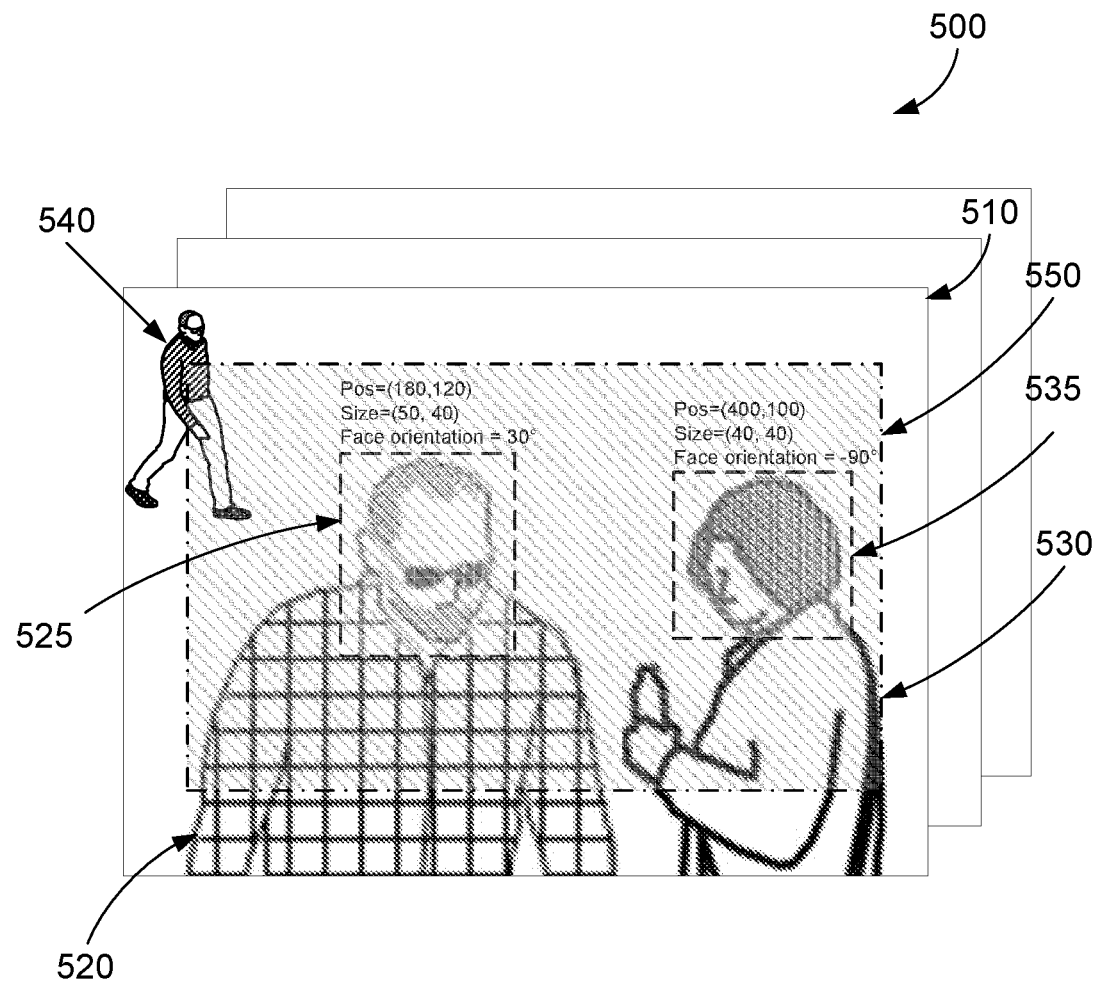
FIG. 5 shows outputs of the method of FIG. 4.

The outputs of step 310 are a set of candidate video segments and the sizes, positions and orientations of the detected faces in each sequential frame of the candidate video segments. FIG. 5 shows an example of one particular frame 510 of such a video segment 500 and the detected faces in the frame 510. In the example of FIG. 5, there are three people in a scene. The faces of person 520 and person 530 are detected in accordance with the method 300 and are highlighted by dashed rectangles 525 and 535 respectively.

Person 540 appearing near a top-left corner of the frame 510 has a face which is smaller than a predetermined size threshold and hence the face of person 540 is not detected by method 300. In an alternate arrangement, only faces that lie within a central region of a frame are candidates for detection. The face of person 540 is located outside a centre portion 550 of the frame 510, where the centre portion 550 is illustrated in FIG. 5 by a shaded region within frame 510. In one arrangement, the location of the face of the person 540 would provide an additional reason for not detecting the face of person 540. The face of person 540 is considered not a candidate for detection and is ignored.

In the example of FIG. 5, each detected face is associated with a set of values indicating position, size, and orientation (i.e., relative to a camera used to capture the frame 510) of the detected face in the frame 510. A positive value for face orientation represents the detected face facing toward a right hand side of the frame 510. A negative value for face orientation represents the detected face facing toward a left hand side of the frame 510. The details on the position, size and orientation of the detected face is described in more detail below with reference to FIG. 7.

The method 300 continues at a face tracking step 320, where a relative position and an orientation of each of the detected faces are tracked over a series of subsequent video frames representing a candidate video sequence. The positions and the orientations of the detected faces are tracked over all frames within the candidate video segment. As described below, the orientation of the detected faces is tracked at step 320 to determine whether a first one of the detected faces (or first detected face) is turning towards a second one of the detected faces (or a second detected face). A method of 600 of tracking faces, as executed at step 320, will be described in detail below with reference to FIG. 6. The output of step 320 is a subset of candidate video segments which show a scene containing at least two faces and the relative face orientation between the two faces.

The face tracking step 320 is followed by a gaze contact detection step 330. At step 330, if two detected faces, among all faces identified and tracked within a current candidate video segment, are turning towards each other in successive video frames of the video segment and after turning towards each other the two detected faces are facing each other (i.e., have gaze contact), then the method 300 follows the "Yes" arrow to a gaze fixation decision step 340. Otherwise, the method 300 follows "No" arrow, returning to 320 where the tracking of position and orientation of faces continues the current video segment. In one arrangement, if a first one of the detected faces is rotating towards a second face while the second face remains stationary and after the first face rotates the pair of faces are facing each other, then the method 300 again follows the "Yes" arrow to step 340. A method 800 of detecting gaze contact, as executed at step 330, is described below in detail with reference to FIG. 8.

Figure 8:
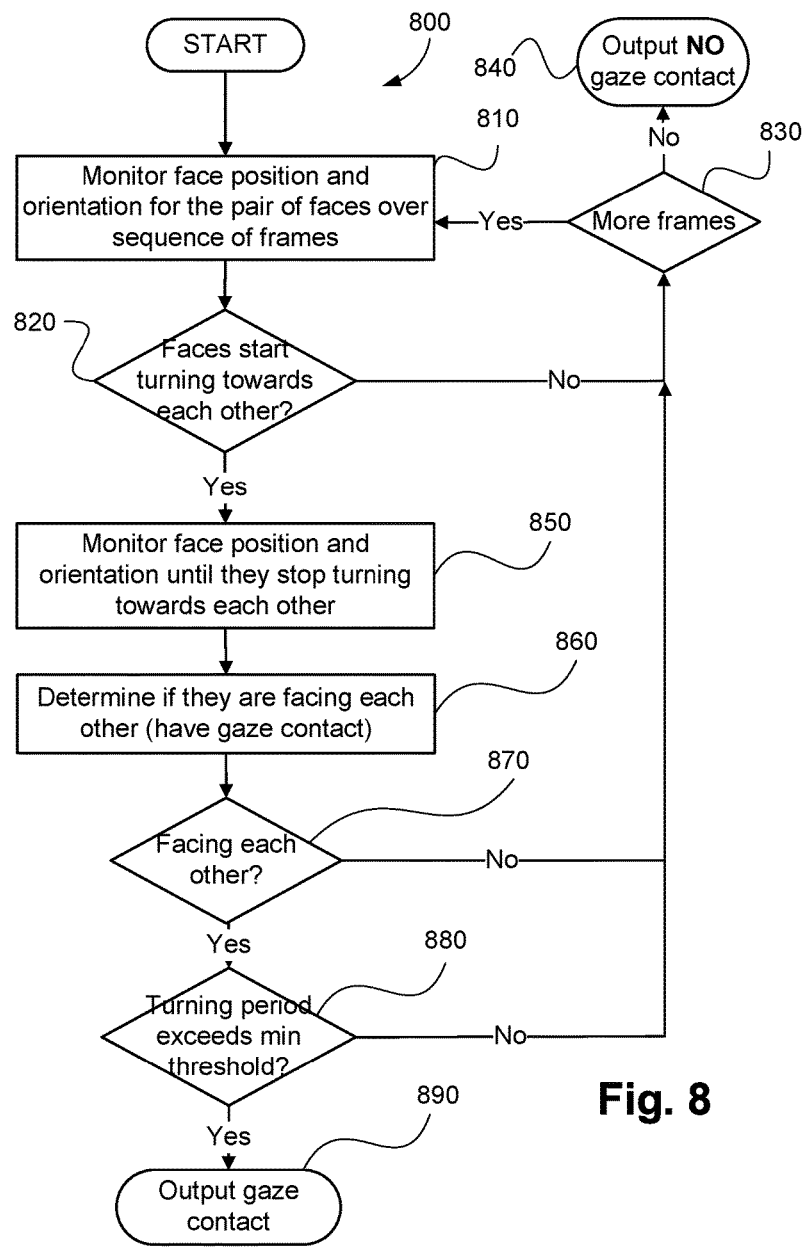
FIG. 8 is a schematic flow diagram showing a method of detecting gaze contact as used in the method of FIG. 3.

In one arrangement, the gaze contact is determined at step 330 based on the positions of the two faces and their relative face orientation in a candidate video segment, as will be described below in detail with reference to FIG. 8.

In one arrangement, instead of performing gaze contact detection at step 330 on a frame-by-frame basis, if there is no gaze contact between the two faces in a current frame, then the method 300 may firstly determine a minimum distance of the eyes of the first face from the a surface of a field of view cone of the second face. A field of view cone is an expression of the extent of the visual attention of a human having a size of about 55 degrees based on the cone of attention of the human eye. A corresponding minimum distance of the eyes of the second face from the surface of the field of view cone of the first face is then determined. If the sum of the minimum distances is greater than that of a previous tested frame, then the method 300 may skip a pre-determined number of frames to a next frame to be tested. Otherwise, the method 300 may skip a number of frames proportional to the sum of the minimum distances.

Following the gaze contact detection step 330, the method 300 proceeds to a gaze fixation determining step 340. At step 340, if the two faces remain facing each other for at least a predetermined number of frames, $N_{gaze}$, following the frame in which gaze contact was first detected at step 330, then gaze fixation is considered to be established between the two faces. The period of time that is equivalent to the $N_{gaze}$ frames may be referred to as a "gaze fixation threshold". If the two faces remain facing each other for at least the predetermined number of frames, $N_{gaze}$, at step 340, then the method 300 follows the "Yes" arrow to selecting step 350. Otherwise, the method 300 returns to step 320.

Step 340 uses the tracked orientation of the detected faces determined at step 320 for determining whether first and second detected faces are oriented towards each other for at least the predetermined number of frames, $N_{gaze}$, defining a gaze fixation of the first and second detected faces.

At step 350, at least one video frame capturing the gaze fixation from the current candidate video segment, is selected under execution of the processor 105. In one arrangement, the predetermined gaze fixation threshold is defined to be one and a half seconds (i.e., equivalent to an $N_{gaze}$ of forty five (45) frames for a thirty (30) frames per second (fps) video). In an alternative arrangement, the gaze fixation threshold may be adjusted based on average speed of head orientation movement of a subject in the current candidate video segment. In yet another arrangement, the gaze fixation threshold may depend on the event type. For example, a small gaze fixation threshold may be more appropriate for sport and action scenes. However, a large gaze fixation threshold may be used for wedding events.

At selecting step 350, at least one video frame is selected from each candidate video segment. The selected video frame captures the engagement period from the candidate video segment as described below. The selected video frame may be subsequently printed in a photobook. As another example, the selected video frame may be used for displaying a summary representation of the candidate video segment or of the video sequence input at step 310.

In one arrangement, one frame is selected in the middle of each candidate video segment where two faces are determined to be having gaze contact and to remain facing each other for a predetermined gaze fixation threshold as determined at steps 330 and 340. Each selected video frame captures the gaze fixation of the detected faces.

In an alternative arrangement, one or more frames are selected at step 350 based on aesthetic image quality measures such as blur, contrast, sharpness, exposure, and photographic composition. In yet another arrangement, if the two faces within the current candidate video segment have significantly different sizes, then the method 300 may select one frame from the current candidate video segment if there are very few frames selected from the entire video.

At the next decision step 360, the method 300 determines whether there are more candidate video segments needed to be processed. If one or more candidate video segments remain to be processed, then the method 300 follows the "Yes" arrow and returns to step 320 to process the next candidate video segment. Otherwise, the method 300 concludes.

Returning to the step 340, if the two faces turn away from each other in less than the predetermined number of frames after gaze contact is detected at step 330, then the method 300 returns to step 320 by following the "No" arrow. The method 300 then resumes the face tracking to detect whether the two faces turn to each other again in a later frame.

Having described the method 300 for selecting at least one video frame (e.g., a desirable video segment or frame) from an input video sequence, the method 400 of detecting a candidate video segment, as executed at step 310 will now described in detail with reference to FIG. 4. The method 400 generates candidate video segments having at least two faces from the input video sequence. The method 400 may be implemented as one or more software code modules of the software application program 133 resident in the hard disk drive 110 being controlled in its execution by the processor 105.

The method 400 begins at a reading step 410, typically at the start of a video or video shot, where successive video frames from the input video sequence are read under execution of the processor 105.

Then at checking step 415, if there are no more video frames to be processed, the method 400 completes. Otherwise, if there are more frames of the input video sequence to be processed, then the "Yes" arrow is followed to detecting step 425.

At detecting step 425, a face detection process is performed to detect faces over a certain size within a current video frame. The face detection process executed at step 425 determines the size, position and orientation of each detected face within the current video frame. The face detection process may not necessarily identify who a particular person shown in the video frame is based on the detected face. The size, position, and orientation of a face in the current frame and details of the current frame (i.e., the frame in which the face is detected) are determined at step 425. Any suitable face detection algorithm may be used at step 425. Size and position of faces can be obtained from such algorithms. In one arrangement, pose detection may be performed at step 425 using the Intel® RealSense™ SDK.

In one arrangement, the minimum face size used at step 425 is based on the resolution of the input video sequence. For example, the minimum size may be set such that a detected face occupies a significant portion of the frame and is sufficiently large that the face can be easily recognised by a human when the face is displayed on a video display 114 or when printed on a piece of paper. In one arrangement, for a standard definition video (e.g., 640 pixels×360 pixels), the minimum face size may be set to eighty (80) pixels wide by eighty (80) pixels high. Similarly, for a high definition video (e.g., 1280 pixels×720p), the minimum face size is scaled linearly to 160 pixels×160 pixels. In one arrangement, the minimum face size used at step 425 may depend on the accuracy of the face detection process. In another arrangement, the face detection process executed at step 425 may additionally recognise the face of each detected individual, and only the sizes, positions, and orientations of the faces of those recognised individuals are determined.

Step 425 is followed by a determining step 430, where the number of detected faces in the current video frame is determined under execution of the processor 105. The current video frame is marked if the frame includes at least two (2) faces.

At decision step 435, if there are at least two faces in the current video frame, then the method 400 proceeds to decision step 445. Otherwise, the method 400 proceeds to step 440.

At step 445, if a new current candidate segment has been created (e.g., within the memory 106), then the method 400 proceeds to step 460, where the current video frame is added to the candidate segment. Otherwise, the method 400 proceeds to step 455, where a new candidate segment is created and stored within the memory 106. From step 455, the method 400 then proceeds to step 460 to add the current video frame to the newly created candidate segment.

If at decision step 435, the current video frame does not have at least two faces within the video frame, then the method 400 proceeds to a further decision step 440. If there is a current candidate segment configured within memory 106 at step 440, then the method 400 proceeds to outputting step 450. Otherwise, the method 400 returns to step 410.

At step 450, the current candidate segment is output (e.g., to memory 106) if the duration of the segment is larger than a predetermined time threshold. Video segments that last less than the predetermined time threshold are discarded. After step 450, the method 400 returns to step 410.

In one arrangement, the predetermined time threshold is set to five (5) seconds. At thirty (30) frames-per-second (fps) for a typical video, five seconds is equivalent to about one-hundred and fifty (150) frames. In an alternative arrangement, the predetermined time threshold is adaptive to the event classification of the input video sequence. For example, a smaller threshold may be used for sport and action scenes, and a larger threshold may be used for a wedding event and a graduation ceremony.

The output of the method 400 is a list of candidate video segments containing at least two faces, and a size, position, and orientation of each detected face in each frame of the candidate video segments.

Figure 6:
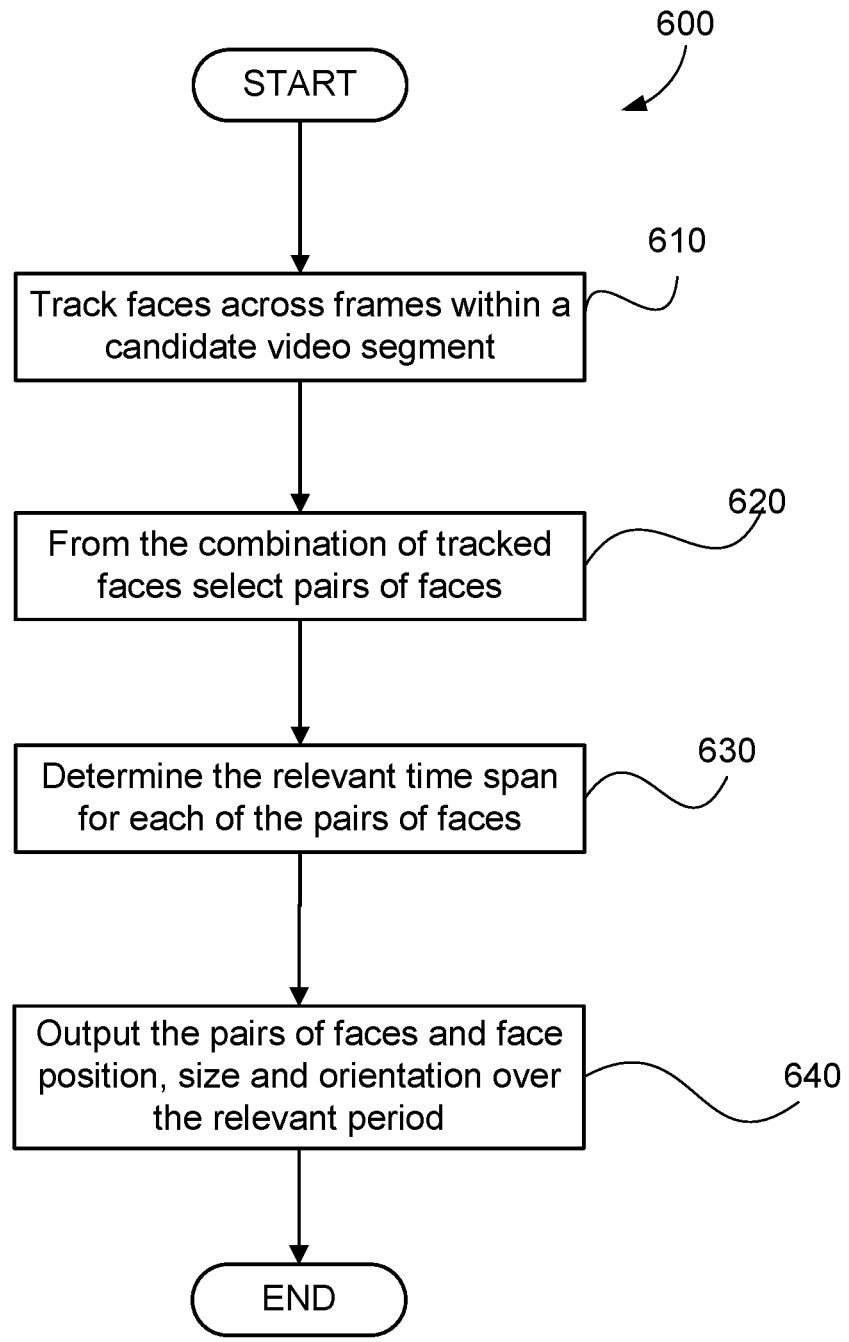
FIG. 6 is a schematic flow diagram showing a method of tracking faces over a series of video frames in a candidate video segment.

The method 600 of tracking faces, as executed at step 320 (FIG. 3), will now be described in more detail with reference to the flow diagram of FIG. 6. The method 600 tracks the orientation of two detected faces over a series of video frames in a candidate video segment. The output of the method 600 is a subset of the candidate video segments of the input list of candidate segments, where each of the candidate segments of the subset contains at least two faces and the relative face orientation between the two faces. The method 600 may be implemented as one or more software code modules of the software application program 133 resident in the hard disk drive 110 being controlled in its execution by the processor 105.

The method 600 begins at a tracking step 610, where faces are tracked across video frames within each candidate video segment of the input list of candidate video segments. There are a variety of methods for tracking faces across frames within a video sequence.

In one arrangement, faces in a current video frame are tracked based solely on the sizes and positions of the detected faces from a previous frame. In an arrangement where faces are tracked based on the sizes and positions of the detected faces from a previous frame, the output of step 310 of the method 300 provides all the information that is required for tracking at step 610. In other arrangements, face orientation is used to improve the accuracy of matching especially when there are many more faces in a scene or when two faces come close to each other. In yet other arrangements, high-level features such as hair colour, skin colour, and eye-glasses may be used to facilitate face tracking.

Figure 4:
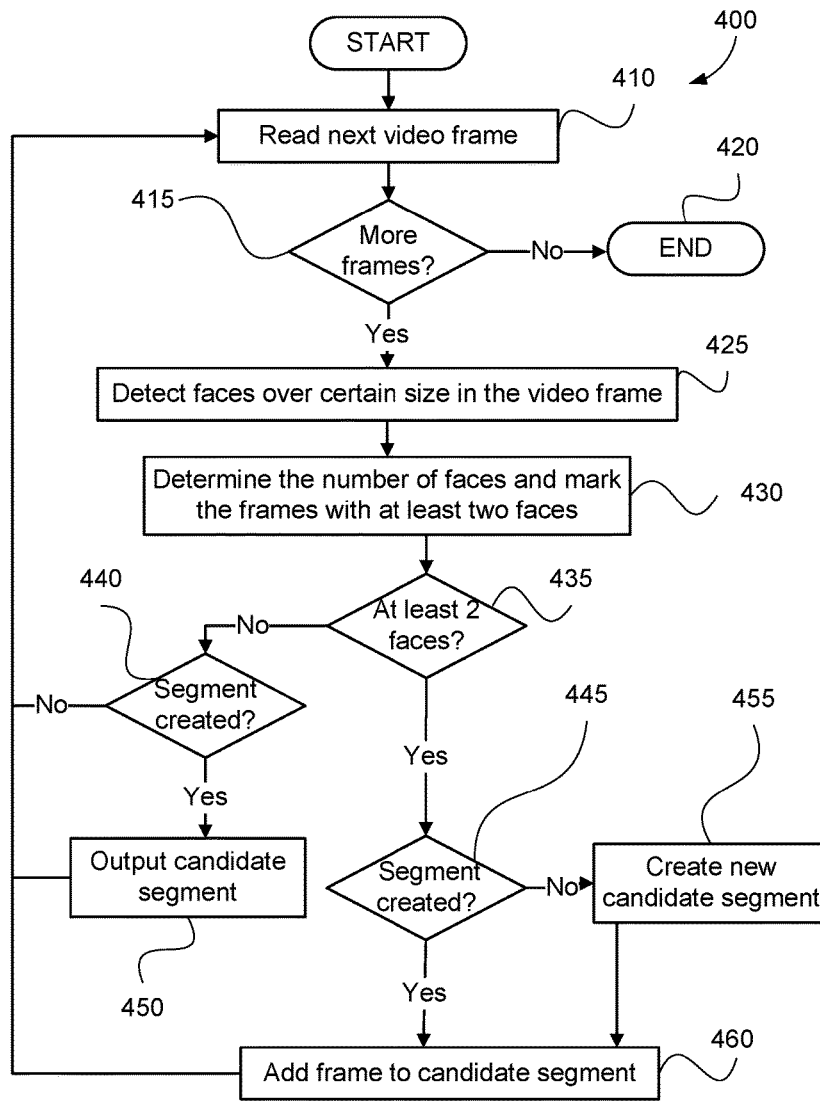
FIG. 4 is a schematic flow diagram showing a method of detecting a candidate video segment as used in the method of FIG. 3.

In one further arrangement, if face recognition is used in step 425 of FIG. 4, detected faces across frames can be matched more efficiently by matching the identity of persons corresponding to the detected faces.

Following from step 610, the method 600 continues to a selecting step 620, where pairs of faces are selected from the total faces in each candidate video segment. For example, if there are three faces A, B, and C, the pairs of faces will be AB, AC, and BC. Combinations of the pairs of faces increase rapidly as the number of faces increases. However, due to size filtering out of smaller faces the number of pairs does not present a computational problem. In another alternative arrangement, only the two largest faces are evaluated for a candidate video segment.

The output of step 620 is sets of pairs of faces. Following step 620, at determining step 630, the time spans that are relevant for each of the pairs of faces are determined under execution of the processor 105. The time spans are determined as the intersection of the periods that the individual faces of the pair are tracked within one of the candidate segments. Additionally, if the relevant period is smaller than the minimum predetermined time threshold of step 450 then the pair of faces will be discarded. Some pairs of faces may not have any period of time that intersect. For example, when a face comes into view and leaves before the second face in the pair comes into view, the faces may not have any period of time that intersect. In a further arrangement, additional filtering may be performed to remove pairs of faces for periods where there is an additional face positioned between the two faces.

Figure 7A:
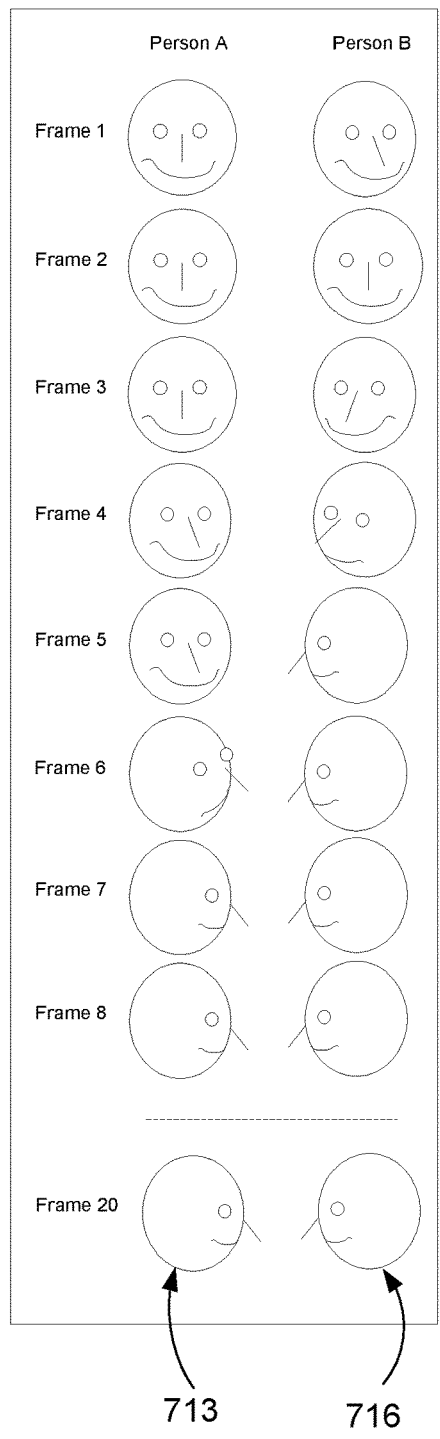
FIG. 7A show a pair of faces over a period of frames within a candidate segment.
Figure 7B:
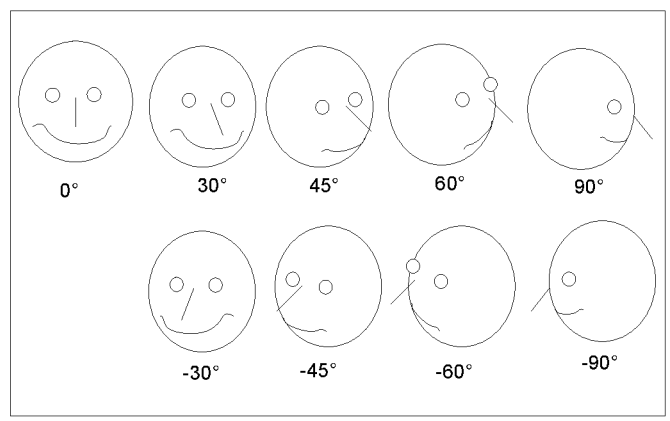
FIG. 7B show angles used to express face orientation.

Then at output step 640, only the remaining pairs of faces having a time span larger than the minimum predetermined time threshold are outputted by method 600. The outputs of step 640 also include position, size and orientation of each face in the pairs and the relative face orientation between the two faces of each remaining pairs of faces. The information output at step 640 is used by method 300 of FIG. 3 to determine whether the two faces are turning towards each other and to determine whether two faces are having a gaze contact in steps 330 and 340, respectively. FIGS. 7A to 7E show examples of faces demonstrating aspects of orientation, position and size. For the purposes of the description, the viewpoint of a person in one of the diagrams is used when stating position. For example, person 716 of FIG. 7A is said to be to the left of person 713. Similarly for orientation, the perspective of the face is used when stating orientation of the person. In FIG. 7B, faces facing to left have positive angles and those faces to the right have negative angles.

FIG. 7A show a pair of faces over a period of frames (i.e., frame 1 to frame 20) within a candidate segment. From frame 1 to frame 5, the face of person B is turning towards person A. From frame 3 to frame 7, person A is turning towards person B. From frame 7 to frame 20 the faces of person A and person B have gaze contact. If the period equivalent to the fourteen (14) frames that person A and person B are facing each other is greater than a predetermined gaze fixation threshold then the faces of person A and person B will be considered to be in the gaze fixation state.

FIG. 7B show angles used to express face orientation. Facing forward is consider to have an angle of zero (0) degrees. Angles greater than zero (i.e., >0) indicate a left facing face and less then zero (i.e., <0) a right facing face. Angles of ninety (90) degrees and negative ninety (−90) degrees are side-ways facing faces. So a face with angle negative ninety degrees (−90) on the left 716 and face of angle ninety degrees (90) on the right 713 are candidates for facing each other. The angles can be extended to greater than ninety degrees (>90) and less than one-hundred and eighty degrees (<180) if the face is left but backwards and less than negative ninety degrees (<−90) and greater than negative one-hundred and eighty degrees (>−180) if facing right but backwards. Faces have gaze contact when the absolute difference between the face angles is equal to 180 degrees and where the relative position of the faces is consistent with those orientations.

Figure 7C:
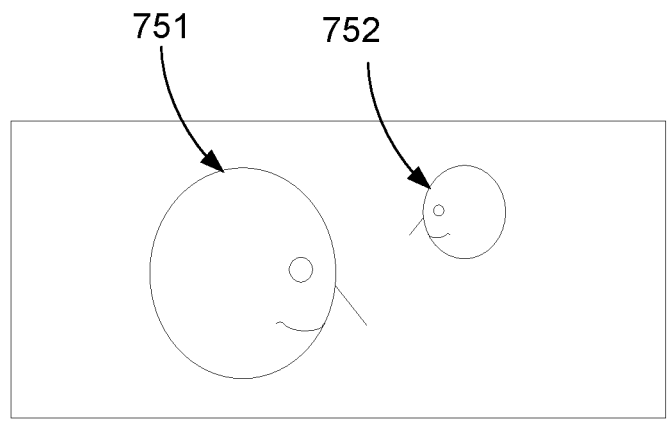
FIG. 7C shows faces of different sizes which can be used to determine that the faces are at a different depth.

FIG. 7C shows faces of different sizes which can be used to determine that the faces are at a different depth. Faces at different depth as in FIG. 7C will not be considered to have gaze contact even though the orientation and position of the faces 751 and 752 is the same as faces 713 and 716.

Figure 7D:
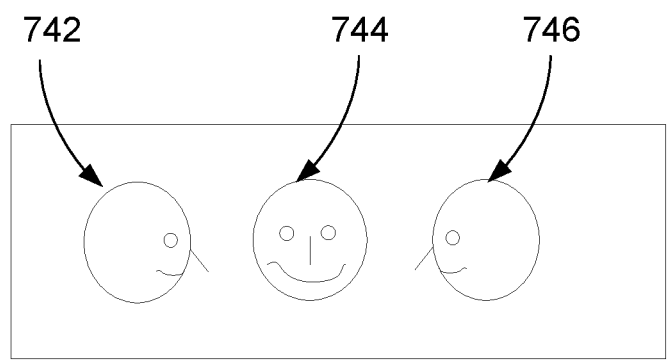
FIG. 7D shows an arrangement where faces have positions and orientation that indicate that the faces have gaze contact.

FIG. 7D shows an arrangement where faces 742 and 746 have positions and orientation that indicate that the faces 742 and 746 have gaze contact. However the third face 744 has similar face size relative to faces 742 and 746 and separates the two faces, so the faces 742 and 746 are not considered to have gaze contact.

Figure 7E:
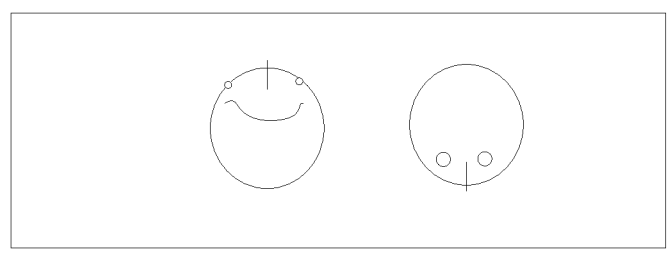
FIG. 7E show faces looking up and looking down.

FIG. 7E show faces looking up and looking down. The positions of the faces in FIG. 7E can be determined by face and head tracking software. When one or both faces are detected to be in one of the states shown in FIG. 7E the faces will not be considered to have gaze contact.

A method 800 of detecting gaze contact, as executed at step 330 (FIG. 3) will now be described in more detail with reference to the flow diagram of FIG. 8. The method 800 determines if gaze contact has been established. The method 800 will be described with reference to the example orientations of FIGS. 7A to 7E.

The method 800 may be implemented as one or more software code modules of the software application program 133 resident in the hard disk drive 110 being controlled in its execution by the processor 105.

The method 800 begins at detecting step 810, where a pair of faces is monitored over the series of frames of a current candidate segment. The orientation and position of the faces in the series of frames are monitored, under execution of the processor 105, to detect if the faces in the frames are turning towards each other. For example, as seen in FIG. 7A person B starts turning towards person A at frame 1.

In the example of FIG. 7A, both of the faces of person A and person B are monitored and it is detected that the face of person B has commenced turning at frame 1 based on the change of angle between frame 1 and frame 2. The relative position of persons A and B and the angle difference being in the negative direction is used at step 810 to determine that the face of person B is turning towards the face of person A.

Then at decision step 820, if the pair of faces being monitored in step 810 have commenced turning towards each other, the Yes arrow is followed to monitoring step 850. Otherwise, the method 800 returns to step 830.

At step 850, the position and orientation of each face of the pair of faces are monitored until the faces stop turning towards each other. In the example of FIG. 7A, the progress of the turning of the face of person B is monitored and it is determined that the face of person B stops turning at frame 6. At the same time, it is detected at frame 4 that the face of person A commences turning towards the face of person B.

In the example of FIG. 7A, between frames 4 and 5 the face of person A has temporarily stopped turning. The method 800 is configured to cope with temporary inconsistencies in the turning of the face of person A towards the face of person B in effect smoothing out the turning. Similarly, it would have been noted that the faces of person A and person B commenced turning at different times and finished turning at different times. Reasonable thresholds for time inconsistencies may be set to determine whether the actions of person A and person B can be considered "simultaneous". In the example of FIG. 7A, at frame 8 it is determined that the faces of person A and person B have stopped turning.

The method 800 progresses to determining step 860, following step 850, to determine whether the faces have gaze contact. As described above with reference to FIGS. 7A to 7E, the factors that are used to determine whether the faces have gaze contact include, for example, face position, face orientation, and the depth of the faces. In one arrangement, a first one of the detected faces (e.g., the face of person A) may be oriented slightly forward relative to a second one of the detected faces (e.g., the face of person B) and/or the second face may be oriented slightly backward relative to the first face, and the faces may still be determined to have gaze contact.

At decision step 870, if the faces do NOT have gaze contact, the method 800 will follow the No arrow to the decision step 830. Otherwise, the method 800 proceeds to step 880.

At step 830, if there are more frames of the current candidate segment to process then the method 800 returns to step 810. Otherwise, if there are no further frames of the current candidate segment to be processed, then the method 800 will output that no gaze contact has been detected at output step 840.

If after step 860 there has been gaze contact detected, at the decision step 870, the method 800 will follow the "Yes" arrow to decision step 880. In one arrangement, a fixed minimum turning period is required to be satisfied before it is confidently established that there is gaze contact. For example, FIG. 7A shows a period of seven (7) frames of turning which typically equates to a period of one-quarter (¼) second. In one arrangement, the minimum turning period is set to a period of one (1) second or more. In an alternate arrangement, a minimum threshold is not required. In a further alternate arrangement, the minimum turning period is variable. The minimum threshold may be determined by factors similar to those discussed above for the gaze fixation threshold. When the turning period exceeds the minimum turning threshold at step 880 the method 800 outputs that gaze contact has been detected at output step 890.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

The invention claimed is:

1. A method of selecting at least one video frame of a video sequence in a database of video sequences, the method comprising:
    detecting, by a processor, a plurality of faces in at least one video frame of the video sequence, wherein the plurality of faces detected in the at least one video frame is determined to exceed a predetermined size threshold based on pixel size of a detected face relative to the at least one video frame;
    tracking, by the processor, an orientation of the detected faces over a series of subsequent video frames to determine whether a first detected face is turning towards a second detected face, wherein the orientation of the detected faces is relative to a camera;
    determining, by the processor, using the tracked orientation of the detected faces, a portion of the video sequence in which the first and second detected faces are oriented towards each other for at least a predetermined number of frames defining a gaze fixation of the detected faces; and
    selecting, by the processor, at least one video frame from the determined portion of the video sequence in the database of video sequences, said selected video frame capturing the gaze fixation of the detected faces.

2. The method according to claim 1, wherein the first detected face is turning towards the second detected face while the second detected face remains stationary.

3. The method according to claim 1, wherein the gaze fixation is dependent on a threshold period.

4. The method according to claim 1, wherein the gaze fixation is dependent on a minimum turning period.

5. The method according to claim 1, wherein faces outside a centre region of the selected frame are ignored.

6. The method according to claim 1, further comprising printing the selected frame in a photobook.

7. The method according to claim 1, further comprising displaying the selected frame in a summary representation of the video sequence.

8. The method according to claim 1, wherein the first detected face is oriented forward relative to the second face and the second face is oriented backward relative to the first face in the frames of the portion of the video sequence.

9. The method according to claim 1, wherein detecting the plurality of faces further comprises detecting the plurality of faces having the same depth in the at least one video frame.

10. A system for selecting at least one video frame of a video sequence in a database of video sequences, the system comprising:
    a memory for storing data and a computer program;
    a processor coupled to the memory for executing the computer program, the computer program comprising instructions for:
    detecting a plurality of faces in at least one video frame of the video sequence, wherein the plurality of faces detected in the at least one video frame is determined to exceed a predetermined size threshold based on pixel size of a detected face relative to the at least one video frame;
    tracking an orientation of the detected faces over a series of subsequent video frames to determine whether a first detected face is turning towards a second detected face, wherein the orientation of the detected faces is relative to a camera;
    determining, using the tracked orientation of the detected faces, a portion of the video sequence in which the first and second detected faces are oriented towards each other for at least a predetermined number of frames defining a gaze fixation of the detected faces; and
    selecting at least one video frame from the determined portion of the video sequence in the database of video sequences, said selected video frame capturing the gaze fixation of the detected faces.

11. An apparatus for selecting at least one video frame of a video sequence in a database of video sequences, the apparatus comprising:
    means for detecting a plurality of faces in at least one video frame of the video sequence, wherein the plurality of faces detected in the at least one video frame is determined to exceed a predetermined size threshold based on pixel size of a detected face relative to the at least one video frame;

means for tracking an orientation of the detected faces over a series of subsequent video frames to determine whether a first detected face is turning towards a second detected face, wherein the orientation of the detected faces is relative to a camera;

means for determining, using the tracked orientation of the detected faces, a portion of the video sequence in which the first and second detected faces are oriented towards each other for at least a predetermined number of frames defining a gaze fixation of the detected faces; and means for selecting at least one video frame from the determined portion of the video sequence in the database of video sequences, said selected video frame capturing the gaze fixation of the detected faces.

12. A non-transitory computer readable medium having a computer program stored on the medium for selecting at least one video frame of a video sequence in a database of video sequences, the program comprising:

code for detecting a plurality of faces in at least one video frame of the video sequence, wherein the plurality of faces detected in the at least one video frame is determined to exceed a predetermined size threshold based on pixel size of a detected face relative to the at least one video frame;

code for tracking an orientation of the detected faces over a series of subsequent video frames to determine whether a first detected face is turning towards a second detected face, wherein the orientation of the detected faces is relative to a camera;

code for determining, using the tracked orientation of the detected faces, a portion of the video sequence in which the first and second detected faces are oriented towards each other for at least a predetermined number of frames defining a gaze fixation of the detected faces; and code for selecting at least one video frame from the determined portion of the video sequence in the database of video sequences, said selected video frame capturing the gaze fixation of the detected faces.

* * * * *